United States Patent [19]

Bandyopadhyay

[11] Patent Number: 5,346,745
[45] Date of Patent: Sep. 13, 1994

[54] ELASTIC MICRO-FABRICATED SURFACE LAYER FOR REDUCING TURBULENCE AND DRAG ON AN OBJECT WHILE IT MOVES THROUGH A FLUID MEDIUM

[75] Inventor: Promode R. Bandyopadhyay, Providence, R.I.

[73] Assignee: The United States of America as represented by the Secretary of the Navy, Washington, D.C.

[21] Appl. No.: 69,820

[22] Filed: Jun. 1, 1993

[51] Int. Cl.$^5$ .................. B32B 3/28; B63B 1/32; B64C 1/06
[52] U.S. Cl. .................. 428/156; 428/136; 428/167; 428/188; 244/124; 244/130; 114/288; 114/290
[58] Field of Search .............. 428/156, 134, 136, 167, 428/178, 188, 192, 212; 244/123, 124, 126, 130; 114/20.1, 67 R, 288, 290

[56] References Cited

U.S. PATENT DOCUMENTS

| | | | |
|---|---|---|---|
| 2,899,150 | 8/1959 | Ellis | 244/130 |
| 3,319,593 | 5/1967 | Dapst | 114/67 |
| 5,171,623 | 12/1992 | Yee | 428/156 |

*Primary Examiner*—Donald J. Loney
*Attorney, Agent, or Firm*—Michael J. McGowan; Prithvi C. Lall; Michael F. Oglo

[57] ABSTRACT

A surface for use in connection with an object in relative motion through a fluid medium includes a plurality of surface elements arranged in rows on the surface, with surface elements of each row being arranged generally orthogonal to the direction of relative motion of the object in a medium. Each surface element includes means defining a cavity, the means including a bottom surface layer, sidewalls, and an upper lip supported along an upstream edge in a cantilevered manner and extending in a downstream direction over the cavity to define a gap permitting fluid communication between the medium and the cavity. The lip is flexible so as to facilitate deflection in response to differentials between pressure inside the cavity and outside the cavity. The cavities of the surface elements in each row are interconnected by means of passageways thereby to facilitate fluid communication therebetween. It is believed that, in the surface layer, in response to local variations in pressure of the medium over surface elements in a row, due to the passage of vortices overhead, the lips of the surface elements deflect to permit equalization of fluid pressure between the medium proximate the surface elements and the respective cavity. The passageways interconnecting the cavities of the surface elements facilitate equalization of pressure between cavities of surface elements in each row, thereby reducing pressure variations, and thereby also reducing turbulence of the medium around the object.

8 Claims, 4 Drawing Sheets

ELASTIC MICRO-FABRICATED SURFACE LAYER FOR REDUCING TURBULENCE AND DRAG ON AN OBJECT WHILE IT MOVES THROUGH A FLUID MEDIUM

STATEMENT OF GOVERNMENT INTEREST

The invention described herein may be manufactured by or for the Government of the United States of America for Governmental purposes without the payment of any royalties thereon or therefor.

BACKGROUND OF THE INVENTION (1) Field of the Invention

The invention relates generally to the field of surface layers for objects, and more particularly to surface layers for reducing turbulence and drag in connection with an object moving through a fluid medium.

(2) Description of the Prior Art

In connection with the movement of objects, including, for example, torpedoes, towed sonar arrays, and submarines, and ships of many varieties, through a fluid medium such as the ocean, the reduction of turbulence, and accompanying drag, is very important. Increased turbulence and drag result in higher energy dissipation in connection with the movement, requiring a concomitant increase in the amount of energy applied to the object to accomplish movement. In addition, turbulence, in particular, caused by movement of an object in a fluid medium results in creation of noise. Larger amounts of turbulence, can increase the likelihood of the object being detected, which can be undesirable in warfare situations.

Over a number of years, efforts have been made to control and reduce turbulence created by movement of objects in fluid media. In one technique that has been developed, riblets have been formed on the surface of the object. This technique reduces drag somewhat, but it does little to help with turbulence. In addition, the drag reduction is only seen within a relatively narrow range of object speeds, which depend on the riblet geometry, and actually increase drag outside of the range. In a second technique, eddy break-up devices have been formed on the surface of the object. This can result in reduced drag in some cases, and also in a slight reduction in the noise due to turbulence, but the required devices generally comprise fairly large protrusions from the object. In a third technique, a fluid is actually injected from the object into the medium proximate the object's surface in regions susceptible to turbulence. This pushes the portions of the medium which might otherwise come into contact with the object generally away from the object, and also cushions the impact thereof onto the object, resulting in a reduction in the amount of turbulence and noise. This is achieved, however, with increase in cost due to the required plumbing, and also may require the object to carry fluid to be injected.

SUMMARY OF THE INVENTION

The invention provides a new and improved surface layer for an object, for reducing turbulence and drag in connection with movement of the object through a fluid medium.

In a brief summary, the new surface layer includes a plurality of surface elements arranged in rows on the surface, with surface elements of each row being arranged generally orthogonal to the direction of relative motion of the object in a medium. Each surface element includes means defining a cavity, the means including a bottom surface layer, sidewalls, and an upper lip supported along an upstream edge in a cantilevered manner and extending in a downstream direction over the cavity to define a gap permitting fluid communication between the medium and the cavity. The lip is flexible so as to facilitate deflection in response to differentials between pressure inside the cavity and outside the cavity in response to the passage of a vortex in the turbulent boundary layer. The cavities of the surface elements in each row are interconnected by means of passageways thereby to facilitate fluid communication therebetween. It is believed that, in the surface layer, in response to local variations in pressure of the medium over surface elements in a row, due to the passage of vortices overhead, the lips of the surface elements deflect to permit equalization of fluid pressure between the medium proximate the surface elements and the respective cavity. The passageways interconnecting the cavities of the surface elements facilitate equalization of pressure between cavities of surface elements in each row, thereby reducing pressure variations, and thereby also reducing turbulence of the medium around the object.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
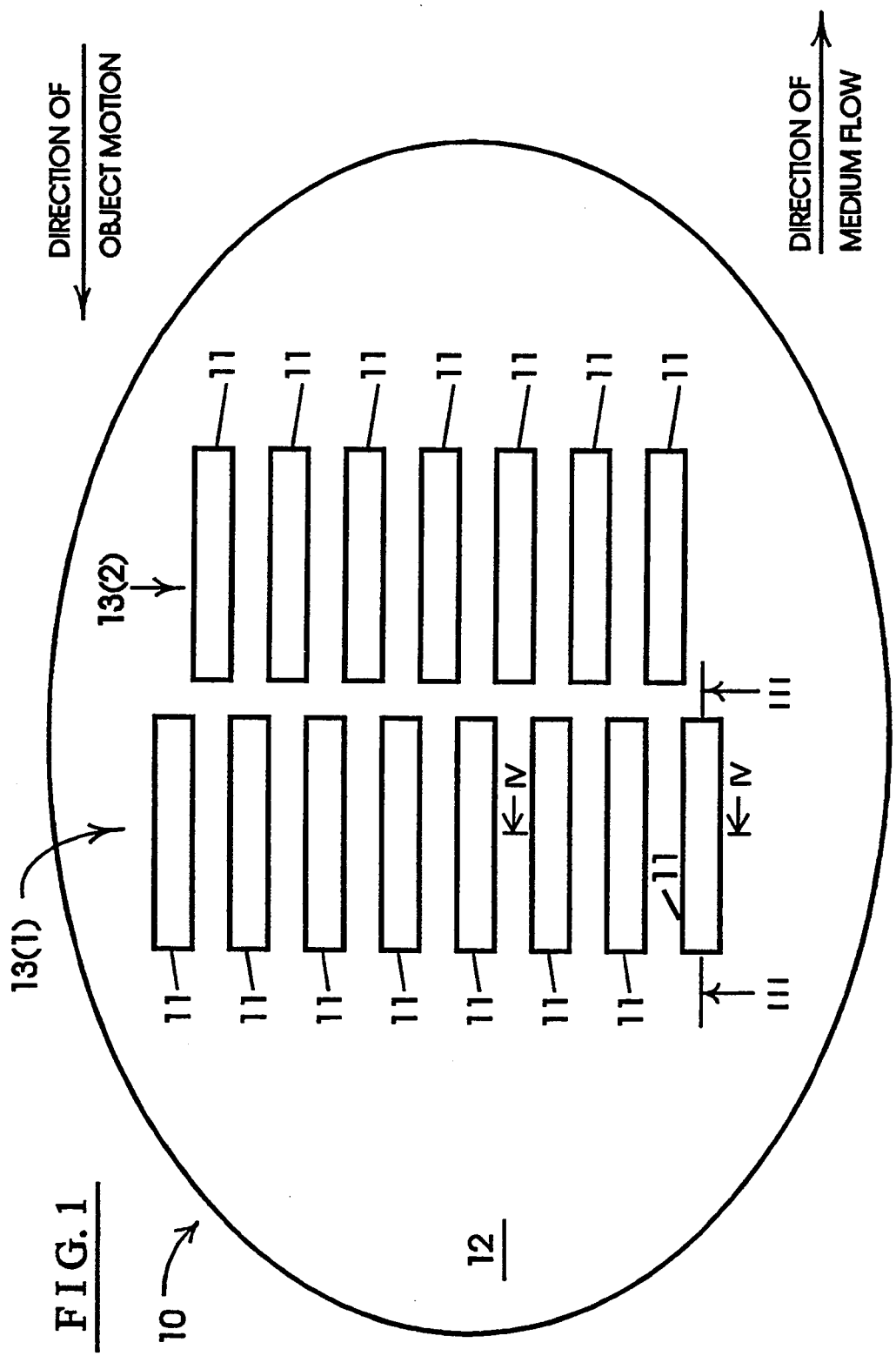
FIG. 1 is a plan view of a portion of an object showing the new surface layer, showing the organization of surface elements on the surface layer.
Figure 2:
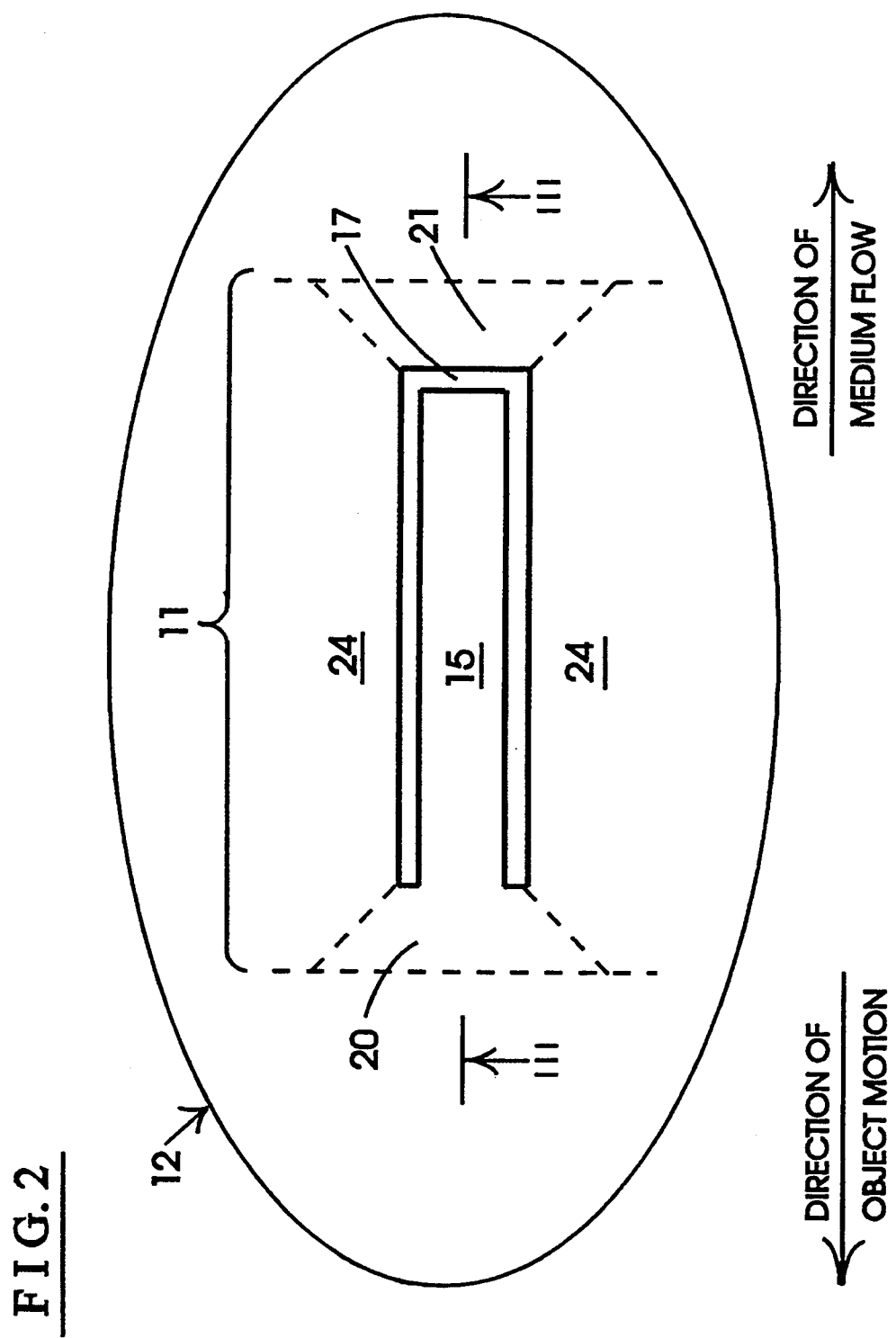
FIG. 2 is a detail of the view depicted in FIG. 1, showing a detail of the plan of one surface element.

FIG. 1 is a plan view of a portion of an object 10 showing the new surface layer 12, showing the organization of elongated surface elements, generally identified by reference numeral 11, on the surface layer 12, and FIG. 2 is a detail of the view depicted in FIG. 1, showing a detail of the plan of one surface element 11. Object 10 may comprise any of a number of kinds of objects which move through fluid media such as the ocean, including, for example, torpedoes, towed sonar arrays, and submarines, and ships of many varieties. In addition, the object may comprise a device which does not normally move through a fluid medium, but which is normally anchored in the medium and past which currents normally flow. The new surface layer provides for a quieter boundary layer when the object 10 moves a fluid medium which reduces turbulence-induced noise and drag.

With reference to FIG. 1, the surface layer 12 includes a plurality of the surface elements 11 organized in staggered rows 13(1), 13(2), . . . [generally identified by reference numeral 13(i)]. The rows of surface elements 11 may be situated on the object 10 along portions of the object which are likely to be subjected to turbulence, including, for example, the nose, tail and at, for example, projections and other discontinuities in the structure of the object. The rows 13(i) are generally arranged orthogonal to the direction of the motion of the object, or the direction of flow of the medium, both of which are illustrated by arrows in FIGS. 1 and 2. In addition, the rows 13(i) are generally symmetrically disposed about an axis along which the object moves through the medium, or with which the medium moves past the object. As shown in FIG. 1, the surface elements 11 are elongated along the direction along which the object is to move through the fluid medium, or along the direction which fluid is to flow past the object 10. In addition, the surface elements 11 in each row are separated by a distance corresponding approximately to the width of a surface element 11, and the surface elements 11 of adjacent rows are staggered by approximately the width of a surface element 11.

Figure 3:
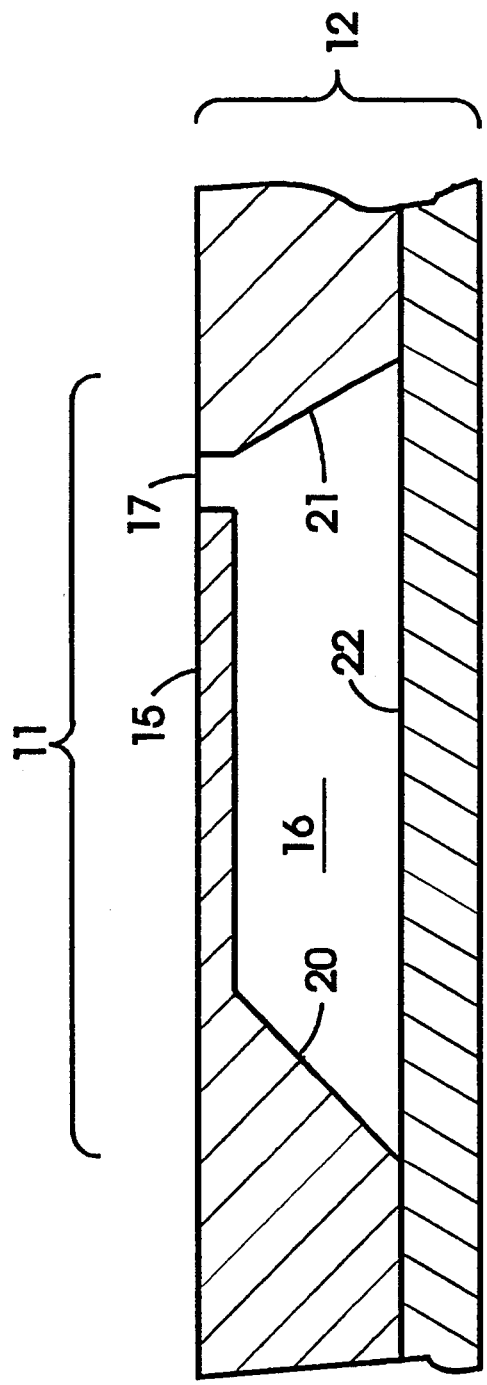
FIG. 3 is a cross-section, taken along line III—III in FIGS. 1 and 2, showing a cross-section of one of the surface elements depicted in FIGS. 1 and 2.
Figure 4:
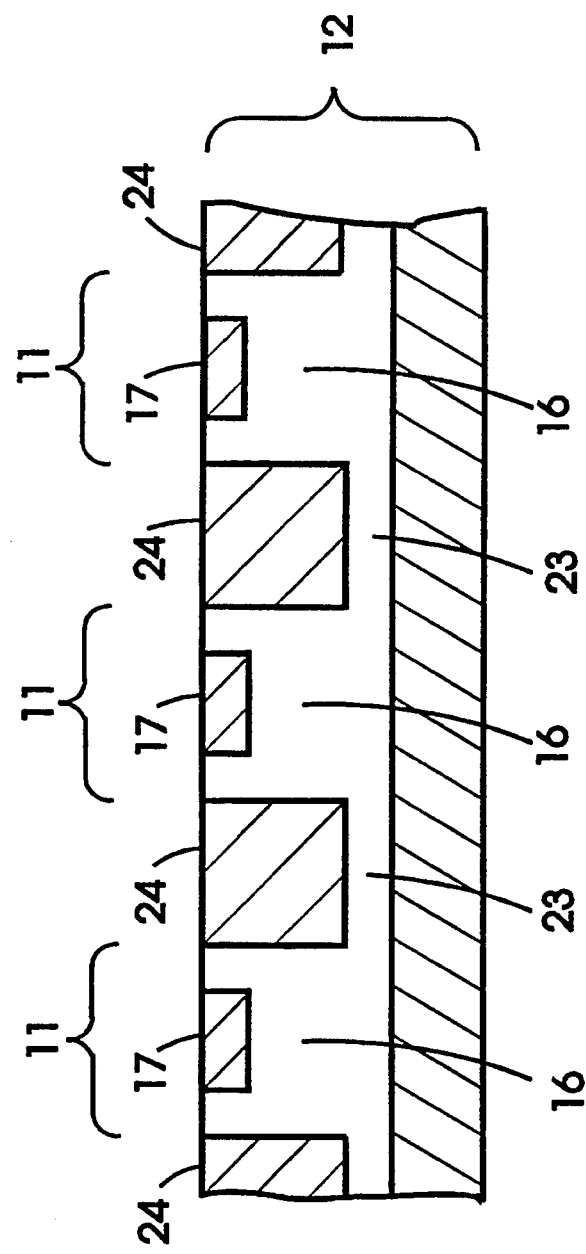
FIG. 4 is a cross-section, taken along line IV—IV in FIG. 1, showing a cross section of a plurality of the surface elements depicted in FIGS. 1 and 2.

The details of an individual surface element 11 will be described in connection with FIGS. 2 through 4. With reference initially to FIGS. 2 and 3, surface element 11 comprises a small elongated flexible lip 15 that is supported in cantilevered fashion and overhangs an elongated cavity 16 formed in the upper portion of the surface layer 12 of the object 10. When the object 10 is immersed in the medium, the medium impinges the surface layer 12 along the upper surface (as shown in FIG. 3) of the surface layer; the object proper is below surface layer 12 (as shown in FIG. 3). The lip 15 is supported at its narrow upstream edge, that is, the edge towards the direction of motion of the object through the medium, or the direction from which the medium flows past the object. The lip 15 and is separated along the remaining three sides from the rest of the top of the surface layer 12 by a narrow gap 17. The cavity, as shown in FIGS. 3 and 4, is formed from the lip 16 at the top, an upstream and a downstream end wall 20 and 21, respectively, and a lower bottom surface 22. As shown in FIG. 4, the cavities 16 of adjacent surface elements 11 in the same row 13(i) communicate by means of intercavity passageways 23 formed from partially-downwardly-depending sidewalls 24 (shown in FIGS. 2 and 4, not shown in FIG. 3). While there is communication between cavities 16 of surface elements 11 in the same row through passageways 23, communication between cavities 16 of surface elements in one row 13(i) with adjacent (upstream and downstream) rows 13(i−1) and 13(i+1) is blocked by end walls 20 and 21.

As noted above, the lip 15 is cantilevered over its cavity 16 and is generally flexible. In operation, when the object 10 is immersed in a fluid medium, the gaps 17 around each lip 15 place the cavities 16 in the surface layer 12 in fluid communication with the medium and permit fluid from the medium to flow into the cavities 16. As the object 10 moves through the medium along the aforementioned axis, in the absence of turbulence the fluid pressure of the fluid medium remains generally constant and symmetric about the object 10. However, if turbulence arises, it is generally reflected in asymmetric variations in the fluid pressure around the object 10. In that case, the surface elements 11 tend to facilitate equalization of the pressure about the axis of motion, effectively reducing the turbulence on the object 10. In that operation, if the turbulence results in a local reduction in pressure of the fluid medium in a particular region of the surface layer 12, the lips 15 of the surface elements 11 in that region will be deflected outwardly by the higher-pressure fluid in the underlying cavities 16 to permit fluid flow from the interior of those cavities 16 into the surrounding medium. Conversely, if the turbulence results in a local increase in pressure of the fluid medium in another region of the surface layer 12, the lips 15 of the surface elements in that region will be deflected inwardly by the higher-pressure fluid of the medium, allowing fluid to flow from the medium into the interior of those cavities 16. Since the cavities 16 of the surface elements 11 in the row are in fluid communication through passageways 23, the cavities 16 and passageways 23 facilitate an equalizing of pressure around the object 10, around the axis of motion, effectively reducing the turbulence pressures around the object 10. In addition, the instantaneous deformation of the surface layer 12 due to the deflections of the lips 15 of the various surface elements 11 may serve to break up turbulence vortices in the medium, which can further reduce the amount of turbulence around and drag on the object 10.

It should be noted that the lips 15 of the various surface elements 11 provide for suction and injection of fluid from and into the medium along direction generally tangential to the plane of surface layer 12, that is, along the plane of the surface layer 12, rather than in a direction normal to the surface layer 12 which may occur in the absence of the lips 15. The sizes of the lips 15, gaps 17 and cavities 16 of the various surface elements 11, the degree of elasticity of the lips 15, and the spacings between surface elements 11, may depend on a number of factors, including the viscosity of the medium, expected turbulence pressures and so forth. In one embodiment, in which the object 10 will be used in sea water, the surface elements 11, in particular the lids 15, are on the order of 3 mm. long and 0.25 mm in width, and have a thickness of 50 microns. The lids 15 overlie cavities of approximately 0.5 mm, and the sidewalls 24 separating the cavities are on the order of 0.25 mm in thickness, so that the passageways 23 between cavities are also on the order of 0.25 mm in thickness. The gap 17 about a lip 15 is on the order of a few microns in width. The bottom surface 22 may be formed from a pyrex or other glass to withstand sea water corrosion, and the remaining portions of the surface layer 12, most particularly the lips 15, may be formed from a semiconductive silicon material, which may be fabricated by conventional micro-machining techniques by etching of thin silicon wafers. In addition, the silicon may be doped in a conventional manner to make it electrically conductive to facilitate dissipation of electrical charges which may accumulate as the object 10 moves through the fluid medium.

The invention provides a number of advantages. In particular, it is highly effective in reducing turbulence and drag over a wide range of speeds of the object relative to the medium, and it is relatively inexpensive, requiring only fabrication of the particular portions of the surface layer 12 described above, and mounting onto the bottom surface 22. Indeed, it can be mounted on a plastic adhesive tape (not shown) and mounted on the bottom surface 22. The surface layer 12 is passive in nature, requiring no external energy source, and no electronic or mechanical sensing equipment to operate, and it requires no plumbing or additional fluid, as required in one technique described above. In addition, the surface layer 12 generates no electro-magnetic field. Since it is has a maximum thickness of approximately 0.5 mm, it does not appreciably increase the size or diameter of the object 10, and hence will not increase the thickness or turbulence of the wake of the object 10 as it moves through the medium, or as the medium flows past the object 10. In addition, the interiors of the cavities can be easily lined with sound or pressure-reducing materials, which can further reduce noise generation.

Although the surface layer 12 has been described such that the cavities 16 of the surface elements 11 in each row 13(i) are blocked from cavities 16 of surface elements 11 in adjacent rows 13(i−1) and 13(i+1), it will be appreciated that in some applications it may be advantageous to permit fluid communication between cavities 16 of surface elements 11 in various ones of the rows.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. For use in reducing turbulence in connection with motion of an object relative to a fluid medium, a surface layer mounted on said object comprising:

(A) a plurality of surface elements arranged in rows on said surface, surface elements of each row being arranged generally orthogonal to the direction of relative motion, each surface element comprising means defining a cavity, said means including a bottom surface layer, sidewalls, and an upper lip supported along an upstream edge in a cantilevered manner and extending in a downstream direction over said cavity to define a gap permitting fluid communication between said medium and said cavity, said lip being flexible so as to facilitate deflection in response to differentials between pressure inside said cavity and outside said cavity; and (B) means defining fluid communication passageways for facilitating fluid communication between cavities of adjacent surface elements in each row.

2. A surface layer as defined in claim 1 in which, in response to local variations in pressure of said medium over surface elements in a row, the lips of the surface elements deflect to permit equalization of fluid pressure between the medium proximate the surface elements and the respective cavity, and the fluid communication passageways facilitate equalization of pressure between cavities of surface elements in each row, thereby reducing pressure variations, and thereby also reducing turbulence of the medium around the object.

3. A surface layer as defined in claim 1 in which surface elements are arranged in a plurality of adjacent rows, with the surface elements of adjacent rows being staggered.

4. A surface layer as defined in claim 3 in which the surface elements all have a common width, the surface elements in each row being separated by a distance corresponding to the width.

5. A surface layer as defined in claim 1 in which the fluid communication passageways between cavities of adjacent surface elements are formed adjacent the bottom surface layer of the cavities.

6. A surface layer as defined in claim 1 in which the surface layer is formed from silicon wafers using micromachining techniques.

7. A surface layer as defined in claim 1 in which the surface layer is formed from a doped semi-conductive material to permit dissipation of electrical charges.

8. A surface layer as defined in claim 1 further comprising means defining inter-row fluid communication passageways for facilitating fluid communication between cavities of surface elements of adjacent rows.

* * * * *